3,444,270
PROCESS OF SUSPENSION POLYMERIZATION UTILIZING SYNERGISTIC SUSPENSION SYSTEM
Vincent A. Aliberti and Speros P. Nemphos, Springfield, Mass., assignors to Monsanto Company, St. Louis, Mo., a corporation of Delaware
No Drawing. Filed Dec. 28, 1965, Ser. No. 517,097
Int. Cl. C08f *1/11, 1/74*
U.S. Cl. 260—878                                        19 Claims

ABSTRACT OF THE DISCLOSURE

An improved process for polymerizing monovinylidene aromatic hydrocarbon monomers is provided by using a synergistic combination of polymeric polycarboxylic acid and a polymeric alcohol. Emulsion loss and wall scale formation are highly desirably controlled while at the same time desirable particle size for the beads is obtained with little or no formation of fines.

---

The present invention relates to an improved process for polymerizing vinylidene aromatic hydrocarbons by suspension polymerization and, more particularly, to a process providing an improved aqueous suspension of the components in such a polymerization process.

Vinylidene aromatic hydrocarbons are employed widely for the production of highly utilitarian polymers and interpolymers. Styrene and interpolymers thereof are the most widely employed vinylidene aromatic hydrocarbons because of low cost commensurate with desirable properties. It is also known that vinylidene aromatic hydrocarbon-rubber blends, i.e., wherein a portion of the vinylidene aromatic hydrocarbon or interpolymers thereof are grafted upon a preformed rubber substrate, have valuable physical properties and particularly significantly increased impact strength. Various types of processes have been proposed for use in polymerizing monovinylidene aromatic hydrocarbons and interpolymers thereof or for grafting the vinylidene aromatic hydrocarbon or interpolymers thereof upon the diene rubber substrate. Of these processes, suspension polymerization affords various advantages but is subject to difficulties in obtaining and maintaining optimum suspension of the components in the aqueous medium, particularly due to the emulsifiability of the monomers which reduces the yield and due to the scale formation on the walls of the reaction vessel. In addition, there are difficulties in controlling bead size and in obtaining reasonable latitude in process operation when efforts are made to reduce the amount of suspending agent or to reduce the ratio of water to syrup without increasing emulsion loss or wall scale formation.

It is an object of the present invention to provide an improved process for polymerizing vinylidene aromatic hydrocarbons wherein the monomer and any coreactants are suspended in an aqueous medium so as to obtain a relatively highly stable and relatively temperature independent suspension which enables reduced emulsion losses and control of wall scale formation.

It is also an object to provide such an improved suspension polymerization process for vinylidene aromatic hydrocarbons which utilizes a novel synergistic suspending system to minimize the amount of suspending agent required and to enable optimum operation with advantages in effective decrease of the water to syrup ratio required and particle size control.

Another object is to provide such an improved suspension polymerization process which is relatively economical and wherein wall scale formation in the reaction vessels may be reduced or readily controlled.

Other objects and advantages will be readily apparent from the following detailed description and claims.

It has now been found that the foregoing and related objects can be readily attained in a process for polymerizing vinylidene aromatic hydrocarbons by a step wherein a polymerizable formulation containing a vinylidene aromatic hydrocarbon monomer is suspended in an aqueous medium in the presence of a suspending agent comprising the synergistic combination of a polymeric polycarboxylic acid and a polymeric alcohol. The suspending agent provides 0.005 to 1.0 percent by weight, based upon the aqueous medium, of both the polymeric polycarboxylic acid and the polymeric alcohol, and the ratio of the monomer formulation to water is about 20–150:100.

The polymeric polycarboxylic acids of the present invention comprise water-soluble homopolymers or interpolymers of unsaturated carboxylic acids having a carbon chain of three to eight carbon atoms. The polymeric acids have a degree of polymerization of at least twenty monomer units and provide a pH of less than 6.5 in aqueous solution. For purposes of the present invention, the homopolymer and interpolymers are considered to be water-soluble if 0.1 part of the polymeric material will dissolve in 99.9 parts of water at 25° centigrade. The term "polycarboxylic" as employed in "polymeric polycarboxylic acids" describes the presence of a plurality of carboxylic groups along the polymer chain and does not require that the monomeric acid be polycarboxylic.

Exemplary of the unsaturated carboxylic acids which may be employed as the carboxylic acid monomer are acrylic, crotonic, isocrotonic, angelic, tiglic, maleic, fumaric, itaconic, citraconic, measconic and aconitic acids or the anhydrides or other derivatives thereof which upon hydrolysis will produce free carboxylic acid groups. Mixtures of such acids may be interpolymerized, and various vinyl monomers also may be interpolymerized therewith so long as the resultant interpolymer is one which has the requisite water solubility and free carboxylic acid groups upon hydrolysis. Illustrative of such vinyl monomers are vinyl halides, allyl compounds, dienes, ethylene, propylene or styrene. As will be readily appreciated, the mol percent of the vinyl comonomers tolerable for water solubility will depend upon the carboxylic monomer and the number of carbon atoms contained in the vinyl comonomer and the nature thereof.

Exemplary of the polymeric polycarboxylic acids which have been employed are interpolymers of acrylic acids and alkyl acrylate esters, interpolymers of vinyl acetate and maleic acid anhydride, polymethacrylic acid, polyacrylic acid and the interpolymers of ethylene and maleic anhydride.

The preferred polymeric polycarboxylic acids are the acrylic acid-acrylate ester interpolymers disclosed in U.S. Patent No. 3,051,682, granted Aug. 28, 1962. This suspending agent comprises a water-soluble interpolymer of an acidic monomer of the group consisting of acrylic acid, methacrylic acid and mixtures thereof, and an ester monomer of the group consisting of an alkyl acrylate, alkyl methacrylate and mixtures thereof, in which the alkyl group contains six to eighteen carbon atoms. As indicated in the aforementioned patent, when acrylic acid is employed as the acidic monomer, the interpolymer will contain (a) 5–15 mol percent of the ester monomer when its alkyl group contains 6–7 atoms, (b) 1.5–8 mol percent of the ester monomer when its alkyl group contains 8–9 carbon atoms, (c) 1–7 mol percent of the ester monomer when its alkyl group contains 10–11 carbon atoms, (d) 1–6 mol percent of the ester monomer when its alkyl group contains 12–15 carbon atoms and (e) 0.5–2.5 mol percent of the ester monomer when its alkyl group contains 16–18 carbon atoms. When methacrylic acid is employed as the acidic monomer, the interpolymer will contain (a) 1–10 mole percent of the ester monomer when its alkyl group contains 6–7 carbon atoms, (b) 0.5–5.0 mol percent of the ester monomer when its alkyl group contains 8–9 carbon atoms, (c) 0.5–2.0 mol percent of the ester monomer when its alkyl group contains 10–11 carbon atoms, (d) 0.3–1.5 mol percent of the ester monomer when its alkyl group contains 12–15 carbon atoms and (e) 0.1–1.0 mol percent of the ester monomer when its alkyl group contains 16–18 carbon atoms.

The reason that the limits on the molar proportions of the two monomer types that may be included in the acrylic-acid acrylate interpolymer vary, depending upon whether acrylic acid or methacrylic acid is included therein, is the fact that methacrylic acid is more hydrophobic than acrylic acid. Accordingly, if a mixture of acrylic acid and methacrylic acid is included in the interpolymer, the limits on the proportions of the two monomer types included in the interpolymer will be intermediate between those set forth above for interpolymers containing either acrylic acid or methacrylic acid as the sole acidic monomer. As a specific example, if a mixture of equal mol proportions of acrylic acid and methacrylic acid is included in the interpolymer with a octyl acrylate, the interpolymer should contain 1.0–6.5 mol percent of the octyl acrylate.

By letting $n$ represent the mol fraction of acrylic acid included in the acidic monomer component of the interpolymer, the lower limit of the ester monomer that can be employed may be restated as (a) $1+4n$ mol percent when the alkyl group of the ester monomer contains 6–7 carbon atoms, (b) $0.5+1n$ mol percent when the alkyl group of the ester monomer contains 8–9 carbon atoms, (c) $0.5-0.5n$ mol percent when the alkyl group of the ester monomer contains 10–11 carbon atoms, (d) $0.3+0.7n$ mol percent when the alkyl group of the ester monomer contains 12–15 carbon atoms, and (e) $0.1+0.4n$ mol percent when the alkyl group of the ester monomer contains 16–18 carbon atoms. The maximum quantity of the ester monomer than can be included in the interpolymer will be (f) $10+5n$ mol percent when the alkyl group of the ester monomer contains 6–7 carbon atoms, (g) $5+3n$ mol percent when the alkyl group of the ester monomer contains 8–9 carbon atoms, (h) $2+5n$ mol percent when the alkyl group of the ester monomer contains 10–11 carbon atoms, (i) $1.5+4.5n$ mol percent when the alkyl group of the ester monomer contains 12–15 carbon atoms, and (f) $1+1.5n$ mol percent when the alkyl group of the ester monomer contains 16–18 carbon atoms. In all the above formulas, $n$ is numerically equal to the mol percent of acrylic acid included in the interpolymer divided by the sum of the mol percent of acrylic acid plus the mol percent of methacrylic acid included in the interpolymer.

As indicated in U.S. Patent No. 2,945,013 granted on July 12, 1960, acrylic acid-acrylate interpolymers may be prepared by admixing a mixture of the two monomers with a free-radical generating polymerization initiator and heating the mixture to a temperature at which the initiator decomposes to form free radicals. Such polymerizations can be carried out by heating the monomers en masse or preferably by first dissolving the monomers in a suitable solvent. In particular, it is preferred to prepare the interpolymers employing a solvent/non-solvent polymerization system, i.e., carrying out the polymerization in an organic liquid that is a solvent for the monomers but a non-solvent for the interpolymer. Typical of the liquids that may be employed as solvents for the polymerization reaction are aliphatic hydrocarbons such as hexane, pentane, octane, petroleum ethers boiling in the range of 50–125° centigrade; aromatic hydrocarbons such as benzene, toluene, xylene, ethylbenzene; chlorinated hydrocarbons such as chlorobenzene, 1,2-dichloroethane, chloroform, carbon tetrachloride; etc.

As disclosed therein, a specific and highly effective interpolymer which is also advantageously employed for the present invention is an interpolymer containing 95.0 to 98.0 mol percent of acrylic acid and 5.0 to 2.0 mol percent of an octyl acrylate and particularly 2-ethylhexyl acrylate.

The preferred dispersing agents of this acrylic acid-acrylate ester interpolymer form have specific viscosities of at least 0.1 when methacrylic acid is the acidic monomer included in the interpolymer and at least about 0.8 when acrylic acid is the acidic monomer included in the interpolymer. Both of the above-noted specific viscosity values are determined in 1.0 percent solutions in water at 25° centigrade in accordance with the following formula:

Specific Viscosity =
$$\frac{\text{Solution Viscosity} - \text{Solvent Viscosity}}{\text{Solvent Viscosity}}$$

Generally, the pH of the polymeric polycarboxylic acids employed may vary within the range of 1.0 to 6.5, but the preferred range is 2.0 to 5.0. When employing an interpolymer of a polycarboxylic acid and an ester, such as the preferred suspending agent hereinbefore described, an increase in the mol percentage of ester groups tends to increase the viscosity of the solution produced thereby.

The polymeric alcohol corresponds to the following general formula:

$$H[CH_2-HCOX-R]_nH$$

wherein X is hydrogen, CHO—, $CH_3CO$—, or $$CH_3CH_2CO—$$

R is —$CH_2$—HCOX—, —$CH_2CH_2$—, or $$-\overset{CH_3}{\underset{|}{C}}HCH_2-$$

$n$ is at least 10; and at least 5 mol percent but not more than about 35 mol percent of X is an ester group to provide optimum water-solubility.

As indicated, the polymeric alcohol is generally prepared by partially hydrolyzing a polymer of a vinyl ester of formic, acetic and propionic acids. It will be appreciated that the polymer may be an interpolymer of these several esters and, as indicated by the formula, it may also be interpolymerized with ethylene, propylene or mixtures thereof. It has been found that at least 5.0 mol percent of the ester group must be provided for operation in accordance with the present invention, but the amount of ester which is hydrolyzed to the alcohol should be sufficient to provide water-solubility. Generally, at least 65 percent of the ester groups must be hydrolyzed to the alcohol and preferably the mol percentage of ester groups is 10 to 25.

Generally, the solubility of the polymeric alcohol increases as the mol percentage of ester groups decreases. However, it has been found that decreasing the mol percentage of ester groups tends to increase the amount of polymeric alcohol required to achieve optimum efficacy in comparable process conditions.

The molecular weight of the polymer, i.e. alcohol, may vary over a wide range consistent with the desired water-solubility. For purposes of the present invention, the polymer, i.e., alcohol, is considered water-soluble if 0.1 part thereof will dissolve in 99.9 parts of water at 25° centigrade. Generally, the polymer, i.e., alcohol, will contain at least 10 monomer units and may contain as much as and even more than 5000 monomer units, depending upon the monomers employed. The preferred polymeric alcohols contain 500–1500 monomer units.

Exemplary of the polymeric alcohols of the present invention are partially hydrolyzed polyvinyl acetate; partially hydrolyzed polyvinyl propionate; partially hydrolyzed polyvinyl formate; partially hydrolyzed ethylene-polyvinyl acetate interpolymers; partially hydrolyzed interpolymers of propylene and vinyl acetate, etc. Specific polymeric alcohols which have proven highly satisfactory in the process of the present invention are partially hydrolyzed polyvinyl acetates containing 10–25 mol percent of vinyl acetate and having a viscosity of 15 to 50 centipoises for a 4.0 percent aqueous solution at 20° centigrade. Generally, such alcohols are relatively neutral in pH (about 6.0–8.0).

The polymeric polycarboxylic acid and polymeric alcohol may be used in a relatively wide range of concentration varying from as little as 0.005–1.0 percent by weight of each based upon the weight of the aqueous medium. It has also been found that the two components may vary relatively widely with respect to each other within the ratio 1–100:10; i.e., one component may be present in an amount as much as ten times greater than the other component. Preferably, the two components are provided in an amount of 0.01–0.5 percent by weight of each and in a ratio of about 2–50:10. As will be appreciated, the optimum concentrations and ratios will be dependent upon the particular polymerizable composition. For example, in polymerizing polystyrene in the presence of a preformed rubber such as butadiene, the polymeric alcohol and the polymeric polycarboxylic acid are most desirably employed in the range of 0.01–0.2 part by weight of each. In polymerizing a mixture of styrene/acrylonitrile monomers in the presence of a preformed butadiene rubber, the two components are desirably provided in a somewhat higher range of 0.02–0.5 percent by weight of each.

As is well known in the art, various electrolytes are employed and may be provided within the range of 0.05–10.0 percent by weight, and preferably in the range of 0.1–5.0 percent by weight, based upon the weight of the aqueous medium. Such electrolytes comprise soluble salts of monovalent, divalent and trivalent metals, including chlorides, sulfates, phosphates and nitrates of metals such as magnesium, calcium, aluminum, and sodium.

In addition, secondary dispersing aids may be included if so desired, such as the condensation products of naphthalene sulfonic acids and aldehydes and the salts thereof such as those proprietary products sold by R. T. Vanderbilt Company under the trademark Darvan; by W. R. Grace under the trademark Daxad; and by Nopco Chemical Company under the trademark Lomar. These secondary dispersing agents may be employed in the range of 0.005–2.0 percent by weight, and preferably are present in an amount less than 0.5 percent by weight.

As will be appreciated, other dispersion aids may be incorporated such as sequestering agents, water-conditioning agents, emulsion depressants and stabilizers.

Illustrative of the effect of varying the amount of the two components is the data in Table 1 below wherein a syrup containing 87 parts by weight of styrene and 13 parts by weight of a preformed butadiene rubber was prepolymerized to 27 percent conversion of the styrene monomer and then dispersed in water to form an aqueous suspension. The synergistic suspending agent composition was provided by a partially hydrolyzed polyvinyl acetate containing 30 weight percent of vinyl acetate and by the interpolymer of acrylic acid and 2-ethylhexyl acrylate wherein the ethylhexyl acrylate comprised 4.5 mol percent of the interpolymer. As a secondary dispersing agent, the sodium salt of a condensation product of naphthalene sulfonic acid and an aldehyde was added (sold by R. T. Vanderbilt Company under the trademark Darvan) and sodium sulfate was added as the electrolyte. The percent emulsion was determined as was the weight percentage of the material lost in the formation of wall scale. In the following table, all amounts are parts by weight unless otherwise indicated.

TABLE 1

| Polymeric alcohol | Polymeric polycarboxylic acid | Secondary dispersing agent | $Na_2SO_4$ | Emulsion, percent by wt. | Wall scale, percent by wt. |
|---|---|---|---|---|---|
| 0.06 | 0.04 | 0.1 | 0.93 | 1.04 | 0.40 |
| 0.06 | 0.06 | 0.1 | 0.93 | 0.88 | 0.37 |
| 0.09 | 0.04 | 0.1 | 0.93 | 1.4 | 0.35 |
| 0.09 | 0.06 | 0.1 | 0.93 | 0.66 | 0.42 |
| 0.08 | 0.05 | 0.1 | 0.93 | 1.65 | 0.31 |
| 0.09 | 0.05 | 0.1 | 0.93 | 1.77 | 0.32 |

As can be seen from the foregoing table, the weight loss of the polymerizable material in the emulsion is relatively small despite relatively wide variations in the amounts of the two components of the synergistic suspending agent. As can be seen, the loss of the polymerizable components to the formation of wall scale is relatively minor despite the variation in the amounts of the two components. Moreover, it can be seen that the two components function in relatively small amounts.

The process of the present invention is employed in the homopolymerization of vinylidene aromatic monomers or the interpolymerization of such vinylidene aromatic monomers with themselves or other interpolymerizable monomers or preformed or partially polymerized polymers. Examples of the vinylidene aromatic monomers that can be homopolymerized or interpolymerized include styrene, alpha-alkyl monovinylidene monoaromatic compounds, e.g., alpha-methylstyrene, alpha-ethylstyrene, alphamethylvinyl toluene, alpha-methyldialkylstyrenes, etc.; ring-substituted alkyl styrenes, e.g., vinyl toluene, o-ethylstyrene, p-ethylstyrene, 2,4-dimethylstyrene, etc.; ring-substituted halostyrenes, e.g., o-chlorostyrene, p-chlorostyrene, o-bromostyrene, 2,4-dichlorostyrene, etc.; ring-alkyl-ring-halo-substituted styrenes, e.g., 2-chloro-4-methyl-styrene, 2,6-dichloro-4-methylstyrene, etc.; vinyl naphthalene; vinyl antracene; divinyl benzene; etc.

Examples of monomers that can be interpolymerized with the vinylidene aromatic monomers include conjugated 1,3-dienes, e.g., butadiene, isoprene, etc., alpha, beta-unsaturated monobasic acids and derivatives thereof, e.g., acrylic acid, methyl acrylate, ethyl acrylate, butyl acrylate, 2-ethylhexyl acrylate and the corresponding esters of methacrylic acid, acrylamide, methacrylamide, acrylonitrile, methacrylonitrile, vinyl halides such as vinyl chloride, vinyl bromide, etc.; vinylidene halides such as vinylidene chloride, vinylidene bromide, etc.; vinyl esters such as vinyl acetate, vinyl propionate, etc.; dialkyl maleates or fumarates such as dimethyl maleate, diethyl maleate, dibutyl maleate, the corresponding fumarates, etc.

The polymerizable formulation may contain a preformed polymer or a partially polymerized material such as a partially polymerized vinylidene aromatic hydrocarbon or interpolymer. In this connection, the present process is particularly adapted to the formation of rubber blends wherein a portion of the vinylidene aromatic hydrocarbon is grafted upon a preformed rubber substrate to produce a high-impact polymer.

As is well known, such blends may have varying amounts of the vinylidene aromatic hydrocarbon or interpolymers thereof chemically combined with the rubber substrate depending upon factors such as the proportion of the interpolymer prepared in the presence of the rubber, the polymerization conditions, etc. Among the rubbers which may be employed are diene rubbers, ethylene-propylene rubbers, acrylate rubbers, and polyisoprene rubbers, and mixtures thereof.

The preferred rubbers are diene rubbers or mixtures of diene rubbers, i.e., any rubbery polymer (a polymer having a second order transition temperature not higher than 0° centigrade, preferably not higher than —20° centigrade, as determined by ASTM Test D-746-52T) of one or more conjugated 1,3-dienes, e.g., butadiene, isoprene, piperylene, chloroprene, etc. Such rubbers include homopolymers of conjugated 1,3-dienes, interpolymers of conjugated 1,3-dienes with one another, and interpolymers of one or more conjugated 1,3-dienes with up to an equal amount by weight of one or more copolymerizable monoethylenically unsaturated monomers, such as monovinylidene aromatic hydrocarbons (e.g., styrene; an aralkylstyrene, such as the o-, m-, and p-methylstyrenes, 2,4-dimethylstyrene, the ar-ethylstyrenes, p-tert-butyl-styrene, etc.; an alpha-alkylstyrene, such as alpha-methylstyrene, alpha-ethylstyrene, alpha-methyl-p-methylstyrene, etc.; vinyl naphthalene, etc.), arholo monovinylidene aromatic hydrocarbons (e.g., the o-, m-, and p-chlorostyrenes, 2,4-dibromostyrene, 2-methyl-4-chlorostyrene, etc.), acrylonitrile, methacrylonitrile, alkyl acrylates (e.g., methyl acrylate, butyl acrylate, 2-ethylhexyl acrylate, etc.), the corresponding alkyl methacrylates, acrylamides (e.g., acrylamide, methacrylamide, N-butyl acrylamide, etc.), unsaturated ketones (e.g., vinyl methyl ketone, methyl isopropenyl ketone, etc.), alpha-olefins (e.g. ethylene, propylene, etc.), vinyl pyridines, vinyl esters (e.g., vinyl acetate, vinyl stearate, etc.), vinyl and vinylidene halides (e.g., the vinyl and vinylidene chlorides and bromides, etc.) and the like.

A preferred group of diene rubbers are those which consist essentially of 85.0 to 100.0 percent by weight of butadiene and/or isoprene and up to 15.0 percent by weight of a monovinylidene aromatic compound.

Although the polymerization reaction may proceed thermally without added catalysts, it is preferable to incorporate a suitable catlayst system for polymerizing the monomer such as the conventional monomer-soluble peroxy compounds. Exemplary catalysts are di-tert-butyl peroxide, benzoyl peroxide, lauroyl peroxide, oleyl peroxide, toluyl peroxide, di-tert-butyl diperphthalate, tert-butyl peracetate, tert-butyl perbenzoate, dicumyl peroxide, tert-butyl peroxide isopropyl carbonate, 2,5-dimethyl-2,5-di(tert-butylperoxy)hexane, 2,5 - dimethyl - 2,5 - di(tert-butylperoxy)hexyne-3, tert-butyl hydroperoxide, cumene hydroperoxide, p-menthane hydroperoxide, cyclopentane hydroperoxide, diisopropylbenzene hydroperoxide, p-tert-butylcumene hydroperoxide, pinane hydroperoxide, 2,5-dimethylhexane-2,5-dihydroperoxide, etc., and mixtures thereof.

The catalyst is generally included within the range of 0.001 to 1.0 percent by weight, and preferably on the order of 0.005 to 0.5 percent by weight of the polymerizable material, depending upon the monomers and the desired polymerization cycle.

As is well known, it is often desirable to incorporate molecular weight regulators such as mercaptans, halides and terpenes in relatively small percentages by weight, on the order of 0.001 to 0.5 percent by weight of the polymerizable material. In addition, it may be desirable to include in relatively small amounts antioxidants or stabilizers such as the conventional alkylated phenols, although these may be added during or after polymerization.

The polymerizable formulation may also contain other additives such as plasticizers, lubricants and colorants. As indicated previously, it may also contain preformed polymeric materials which are soluble or dispersible in the monomers.

The polymerization may be carried out by charging the polymerizable formulation with a catalyst to a suitable reactor, and thereafter polymerizing the formulation en masse by stirring and heating at a temperature of 75 to 125° centigrade and over a period of about one to forty-eight hours, at a pressure of 1–100 pounds per square inch until a portion of the monomer has been polymerized, generally about 15.0–50.0 percent by weight thereof. The time for this partial polymerization will vary dependent upon the catalyst, pressures and temperatures employed and the particular monomers. Generally, it is preferred to conduct such a prepolymerization process to convert approximately 20.0 to 35.0 percent by weight of the monomer.

The syrup provided by the partially polymerized formulation then is admixed with water and the suspending agent of the present invention to obtain the desired suspension of the syrup in the aqueous medium. This suspension is subjected to agitation at a temperature of about 75 to 200° centigrade for a period of one to forty-eight hours to obtain substantially complete polymerization of the monomers therein. Preferably, such further polymerization is carried out at a temperature of about 100 to 170° centigrade for a period of one to twenty hours depending upon the catalyst and the amount thereof employed.

In another embodiment of the present invention, the water and the suspending agent may be admixed with the polymerizable formulation initially, and the entire polymerization reaction caused to proceed in the presence thereof. Alternatively, the suspending agent may be incorporated in the polymerizable formulation during non-aqueous polymerization thereof as hereinbefore provided and thereafter the partially polymerized syrup admixed with water to achieve the desired suspension. It will be apparent that additional monomers, catalyst and other components may be introduced into the polymerizable formulation at various stages during polymerization as so desired.

The preferred process of the present invention utilizes prepolymerization of the polymerizable formulation en masse to approximately 20 to 35 percent conversion. Thereafter, the partially polymerized syrup is suspended in water with the addition of the suspending agent at that time to minimize any tendency for emulsion formation. Generally, such syrups will have a viscosity of 40 to 20,000 poises at 25° centigrade at a shear rate of 1.0 second$^{-1}$.

The polymerizable formulations contain at least 10 percent by weight of the vinylidene aromatic monomer and preferably at least 30 percent by weight of such monomer. Mixtures of such vinylidene monomers with acrylonitrile or methacrylonitrile monomers are highly advantageously employed for making styrene/acrylonitrile-type interpolymers. Generally, such mixtures will contain 20 to 95 percent by weight, and preferably 60 to 85 percent by weight, of the vinylidene aromatic hydrocarbon and 80 to 5 percent, and preferably 40 to 15 percent, by weight of the acrylonitrile or methacrylonitrile or mixture thereof.

As previously indicated, the present invention is highly advantageously employed in preparing polymer blends containing a preformed rubber wherein a portion of the vinylidene aromatic hydrocarbon or other comonomers are grafted upon the preformed rubber substrate. In such compositions, the preformed rubber, which may be an interpolymer such as of butadiene and one or more of the monomers of the polymerizable formulation, may constitute 1 to 30 percent by weight of the polymerizable formulation and preferably 1 to 20 percent by weight thereof.

Illustrative of the efficacy of the present invention are the following specific examples, wherein all amounts are parts by weight, unless otherwise indicated:

EXAMPLE 1

To a reaction vessel are charged 87 parts styrene monomer, 13 parts of a butadiene rubber having a Mooney viscosity of 55 centipoises, and 5 parts of mineral oil. In addition, di-tert-butyl peroxide and tert-dodecyl mercaptan, and tris(nonylphenyl) phosphite are added as catalyst, molecular weight regulator and stabilizers. After the reaction vessel is purged of oxygen by a stream of nitrogen, the reaction mixture is stirred and heated to polymerize approximately 27 percent of the styrene. The resulting syrup has a viscosity in excess of 100 poises at 25° centigrade at a shear rate of 1.0 second$^{-1}$.

Part A

This partially polymerized syrup is then admixed with 105 parts of water having dissolved therein 0.35 part of anhydrous magnesium sulfate, 0.15 part of a condensate of a sodium salt of a naphthalene sulfonic acid sold under the trademark Darvan by R. T. Vanderbilt Company and 0.19 part of polyvinyl alcohol having 26 percent by weight residual acetate and a viscosity of 44 centipoises in a 4 percent aqueous solution at 25° centigrade. The suspension is agitated and heated to polymerize the remaining monomer, cooled, centrifuged, washed and dried to recover the product in the form of small spherical beads.

The beads recovered from the above process are found to have a mean particle size of 0.017 inch and to contain a large proportion of fines. The emulsion loss is 3.78 percent, and the wall scale formulation is of a low order.

Part B

The process of Part A is substantially repeated using as the suspending agent 0.22 part of an interpolymer of 95.5 mol percent of acrylic acid and 4.5 mol percent of 2-ethylhexyl acrylate which has a specific viscosity of about 4.0 as determined in a 1 percent solution in water at 25° centigrade. The pH of a 1 percent aqueous solution is 2.95 and its viscosity is 6.8 centistokes at 25° centigrade. The beads recovered from the procedure has a mean particle size of 0.034 with little formation of fines. The emulsion loss is 3.70 percent and the wall scale formation is very high.

Part C

The process of Part A is repeated substantially but using as the suspending agent a synergistic combination of 0.035 part of the polyvinyl alcohol of Part A and 0.05 part of the interpolymer of Part B. The beads recovered from the procedure are found to be relatively uniform in size and to have a mean particle size of 0.039 inch. The emulsion loss is only 1.26 percent and the wall scale formation is tolerable for production purposes.

Thus, it can be seen that lower amounts of the two components in combination provide greatly enhanced results including optimum control of bead size and emulsion loss.

EXAMPLE 2

A prepolymerized syrup is prepared by a process similar to that of Example 1 and is admixed with 105.0 parts of water having dissolved therein 0.04 part of a partially hydrolyzed polyvinyl acetate containing 26.0 percent by weight of vinyl acetate, 0.05 part of the interpolymer of acrylic acid and 2-ethylhexyl acrylate (containing 4.5 mol percent of 2-ethylhexyl acrylate and having a specific viscosity of 4.0), 0.1 part of a sodium salt of naphthalene sulfonic acid sulfonate (Darvan) and 0.47 part by weight of magnesium sulfate. After agitation to obtain suspension of the syrup in the aqueous medium, the suspension is heated and agitated to polymerize the monomers, cooled, centrifuged, washed and dried to recover the product in the form of beads.

The bead products recovered from the process are found to have a mean particle size of 0.032 inch and to be relatively uniform in size. The wall scale formation is tolerable for production purposes.

EXAMPLE 3

A prepolymerized syrup substantially as indicated in Example 1 is suspended in water using as a suspending agent 0.04 part of a partially hydrolyzed polyvinyl acetate containing 26.0 percent by weight vinyl acetate and 0.04 part of an interpolymer of acrylic acid and 2-ethylhexyl acrylate containing only 1 mol percent of 2-ethylhexyl acrylate and having a viscosity of 3.6 centistokes in a 1 percent aqueous solution at 25° centigrade and a pH of 3.15. In addition, the formulation contains 0.3 part magnesium sulfate and 0.15 part of the sodium salt of the naphthalene sulfonic acid condensate.

After polymerization and recovery of the beads, the beads are found to be substantially free from fines and of relatively uniform size. The emulsion loss is determined to be only 0.55 percent by weight. The wall scale formation is tolerable for commercial purposes.

EXAMPLE 4

The procedure of Example 3 was repeated substituting for the 2-ethylhexyl acrylate-acrylic acid interpolymer, a polyacrylic acid having a viscosity of 1.8 centistokes in 1.0 percent aqueous solution at 25° centigrade and a pH of 2.95 in such solution.

Upon completion of the polymerization process and recovery of the beads, it is found that the emulsion loss was only 1.2 percent by weight and that the beads are of substantially uniform size and essentially free from fines. The wall scale is tolerable for commercial purposes.

EXAMPLE 5

The procedure of Example 3 is substantially repeated substituted for the 2-ethylhexyl acrylate-acrylic acid interpolymer, 0.04 part of an interpolymer of vinyl acetate and maleic acid anhydride sold by Monsanto Company under the designation PDR-1. A 1.0 percent aqueous solution of the interpolymer has a viscosity at 25° centigrade of 8.5 centistokes and a pH of 2.45.

The beads produced according to the process are found to be of substantially uniform size without significant fine formation. The emulsion loss is only 0.65 percent and the wall scale is tolerable for commercial conditions.

EXAMPLE 6

The procedure of Example 3 is repeated substituting for the 2-ethylhexyl acrylate-acrylic acid interpolymer, a polymethacrylic acid which in a 1.0 percent aqueous solution at 25° centigrade has a viscosity of 1.9 centistokes and a pH of 3.4.

Upon recovery, the beads are found to be of substantially uniform size and essentially free from fines. The emulsion loss is only 0.65 percent and the wall scale is tolerable for commercial purposes.

EXAMPLE 7

The procedure of Example 3 is repeated substituting for the 2-ethylhexyl acrylate-acrylic acid interpolymer, an interpolymer of ethylene and maleic acid anhydride. Four parts of the interpolymer are boiled in 100 parts of water to achieve solution thereof. A 1.0 percent aqueous solution at 25° centigrade has a viscosity of 1.7 centistokes and a pH of 2.9.

Upon recovery, the beads are found to be substantially uniform in size and essentially free from fines. The emulsion loss is only 0.63 percent and the wall scale is tolerable for commercial purposes.

EXAMPPLE 8

The process in Example 2 is substantially repeated but omitting the Darvan secondary dispersion aid and utilizing for the suspension system 0.04 part of the partially hydrolyzed polyvinyl acetate having 30.0 percent by weight vinyl acetate and 0.05 part of the interpolymer of 2-ethylhexyl acrylate-acrylic acid. In addition, 0.3 part sodium sulfate and 0.15 part of magnesium sulfate are incorporated as the electrolyte.

Upon recovery, the beads are found to be of relatively uniform size and substantially free from formation of fines. The emulsion loss is only 0.62 percent and the wall scale formation is tolerable for commercial purposes.

EXAMPLE 9

Ten parts of a butadiene rubber having a Mooney viscosity of 55 centipoises, 63 parts of styrene monomer and 27 parts of acrylonitrile monomer are heated and agitated in a reaction vessel to polymerize approximately 30 percent of the monomers. The syrup has a viscosity of 5000 poises at 25° centigrade.

Part A

One hundred parts of syrup are admixed with 100 parts water, 0.2 part of a partially hydrolyzed polyvinyl acetate containing 30.0 percent by weight vinyl acetate, 1.0 part sodium chloride and 0.2 part of the sodium salt of a naphthalene sulfonic acid condensate (Darvan).

Upon completion of polymerization and recovery of the beads, it is found that the emulsion loss is 6.07 percent by weight, that the wall scale formation is 5.0 percent by weight. The product includes 5.0 percent by weight of agglomerated particles which are unusable and the beads are found to have an average size of 0.01 inch.

Part B

The process of Part A is repeated substituting for the partially hydrolyzed polyvinyl acetate 0.2 part of 2-ethylhexyl acrylate-acrylic acid interpolymer (4.5 mol percent).

Upon recovery of the beads after completion of polymerization, the beads are found to be of more uniform size and to have an average particle size of 0.05 inch. The emulsion loss is found to be 6.5 percent by weight, and the wall scale is found to constitute about 5.0 percent. There are no lumps or large agglomerates.

Part C

The procedure of Part A is repeated employing in this instance 0.05 part of a partially hydrolyzed polyvinyl acetate containing 30.0 percent by weight vinyl acetate, 1.0 part sodium chloride and 0.2 part of the sodium salt of a naphthalene sulfonic acid condensate (Darvan) and 0.05 part of 2-ethylhexyl acrylate-acrylic acid interpolymer (4.5 mol percent).

Upon completion of the polymerization reaction, the recovered beads are found to be of substantially uniform size and to have a mean particle diameter of about 0.03 inch. The emulsion loss is only 3.5 percent by weight, and the wall scale is only 1.0 percent by weight.

EXAMPLE 10

A polymerizable material containing 10.0 parts butadiene rubber, 63.0 parts styrene and 27.0 parts acrylonitrile is prepolymerized to about 25.0 percent conversion to produce a syrup having a viscosity of 2500 poises at 25° centigrade.

One hundred parts of the syrup is dispersed in 90.0 parts of water using as the suspending agent 0.05 part of a partially hydrolyzed polyvinyl acetate containing 30 weight percent vinyl acetate and 0.05 part of the interpolymer of acrylic acid and 2-ethylhexyl acrylate containing 4.5 mol percent of the 2-ethylhexyl acrylate. 1.0 part of sodium sulfate is employed as the electrolyte and 0.2 part of the sodium salt of the condensation product of naphthalene sulfonic acid and an aldehyde (Darvan) is included as a secondary dispersing agent. The suspension is then heated and agitated to polymerize the remaining monomers.

Upon recovery of the beads, the average bead size is found to be 0.04 inch, and the beads are found to be of substantially uniform size with no significant amount of fines. The emulsion loss is only 2.2 percent by weight, and the wall scale is only 2.0 percent by weight.

Thus, it can be seen from the foregoing specific examples that the synergistic combination of the present invention enables obtaining equivalent, and in fact superior, results with far less of the two components combined than either component alone. It is possible to obtain greater control of bead size, low losses of the monomers in the formation of emulsion and relatively low losses in the formation of wall scale thus enabling more efficient utilization of the reactors without the requirement for frequent cleaning operations. The suspending agent system of the present invention may be utilized with various types of syrups which are relatively insoluble in water and may also be employed with a variety of suspension polymerization processes; i.e., where the polymerizable formulation is initially partially polymerized before addition to water or where the polymerizable formulation is initially dispersed in water and all polymerization carried out in the presence thereof. The production of beads of relatively uniform size without agglomeration or excessive production of fines is extremely advantageous in obtaining economics in the suspension polymerization process and in obtaining a high-quality product.

It is obvious that many variations can be made in the products and processes set forth above without departing from the spirit and scope of this invention.

What is claimed is:

1. In a process for polymerizing vinylidene aromatic hydrocarbons, the steps comprising suspending in an aqueous medium a polymerizable formulation containing at least 10 percent by weight of a vinylidene aromatic hydrocarbon monomer in the presence of a suspending agent comprising the synergistic combination of a polymeric polycarboxylic acid and a polymeric alcohol in amounts of from 0.005 to 1.0 percent by weight, based upon the aqueous medium, of each of said polymeric polycarboxylic acid and polymeric alcohol, the ratio of monomer formulation to water being 20 to 150:100, said polymeric polycarboxylic acid comprising a water-soluble homopolymer or interpolymer of unsaturated carboxylic acids having a carbon chain of three to eight carbon atoms and having a degree of polymerization of at least twenty monomer units and providing a pH of less than 6.5 in aqueous solution, said polymeric alcohol corresponding to the following formula:

$$H[CH-HCOX-R]_nH$$

wherein X is hydrogen, HCO—, $CH_3CO$—, or $$CH_3CH_2CO—$$

R is —$CH_2HCOX$—, —$CH_2CH_2$—

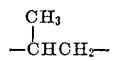

$n$ is at least 10, and at least 5 mol percent but not more than about 35 mol percent of X is an ester group for optimum water-solubility; and thereafter polymerizing said polymerizable formulation.

2. The process of claim 1 wherein said polymerizable formulation is a syrup wherein a portion of the vinylidene aromatic hydrocarbon monomer has been prepolymerized and wherein said syrup has a viscosity of 40 to 20,000 poises at 25° centigrade at a shear rate of 1.0 second$^{-1}$.

3. The process of claim 1 wherein said vinylidene aromatic hydrocarbon monomer is styrene.

4. The process of claim 1 wherein said polymerizable formulation contains at least one monomer interpolymerizable with said vinylidene aromatic hydrocarbon monomer.

5. The process of claim 1 wherein said polymerizable formulation contains a preformed rubber upon which said vinylidene aromatic hydrocarbon monomer may be grafted.

6. The process of claim 1 wherein said polymeric alcohol comprises a partially hydrolyzed polyvinyl ester.

7. The process of claim 1 wherein said polymeric polycarboxylic acid is an interpolymer of an acid selected from the group consisting of acrylic, methacrylic and mixtures thereof, and an alkyl ester of an acid selected from the group consisting of acrylic, methacrylic and mixtures thereof, the alkyl group containing six to eighteen carbon atoms.

8. The method in accordance with claim 1 wherein said suspending agent comprises 0.01 to 0.5 percent by weight of a partially hydrolyzed polyvinyl ester and 0.01 to 0.5 percent by weight of an interpolymer of an acid selected from the group consisting of acrylic, methacrylic and mixtures thereof, and of an alkyl ester of an acid selected from the group consisting of acrylic, methacrylic and mixtures thereof, the alkyl group containing six to eighteen carbon atoms, said polyvinyl ester and interpolymer being present in a ratio of 2 to 50:10.

9. The method of claim 1 wherein said aqueous formulation contains 0.05 to 10.0 percent by weight of a soluble inorganic salt as an electrolyte.

10. The process of claim 1 wherein said polymerizable formulation comprises a mixture of a vinylidene aromatic hydrocarbon monomer, an unsaturated nitrile monomer selected from the group consisting of acrylonitrile, methacrylonitrile and mixtures thereof, and a preformed rubber upon which said aromatic hydrocarbon and nitrile may be grafted, said vinylidene aromatic hydrocarbon comprising 20 to 95 percent by weight of the monomers in said formulation and said rubber comprising 1 to 30 percent by weight of the total weight of said polymerizable formulation.

11. In a process for polymerizing vinylidene aromatic hydrocarbons, the steps comprising heating and agitating a polymerizable formulation containing at least 10 percent by weight of a vinylidene aromatic hydrocarbon monomer to polymerize 15 to 50 percent by weight of the monomers therein and obtain a syrup having a viscosity of 40 to 20,000 poises at 25° centigrade at a shear rate of 1.0 second$^{-1}$; suspending said syrup in an aqueous medium to which is added a suspending agent comprising the synergistic combination of a polymeric polycarboxylic acid and a polymeric alcohol in amounts of from 0.005 to 1.0 percent by weight, based upon the aqueous medium, of each of said polymeric polycarboxylic acid and polymeric alcohol, the ratio of monomer formulation to water being 20 to 150:100, said polymeric polycarboxylic acid comprising a water-soluble homopolymer or interpolymer of unsaturated carboxylic acids having a carbon chain of three to eight carbon atoms and having a degree of polymerization of at least twenty monomer units and providing a pH of less than 6.5 in aqueous solution, said polymeric alcohol corresponding to the following formula:

$$H[CH—HCOX—R]_nH$$

wherein X is hydrogen, HCO—, $CH_3CO$—, or $$CH_3CH_2CO—$$

R is 

$n$ is at least 10, and at least 5 mol percent but not more than about 35 mol percent of X is an ester group for optimum water-solubility; and thereafter polymerizing said polymerizable formulation.

12. The process of claim 11 wherein said vinylidene aromatic hydrocarbon monomer is styrene.

13. The process of claim 11 wherein said polymerizable formulation contains a preformed rubber upon which said vinylidene aromatic hydrocarbon monomer may be grafted.

14. The process of claim 11 wherein said polymeric alcohol comprises a partially hydrolyzed polyvinyl ester.

15. The method in accordance with claim 11 wherein said suspending agent comprises 0.01 to 0.5 percent by weight of a partially hydrolyzed polyvinyl ester and 0.01 to 0.5 percent by weight of an interpolymer of an acid selected from the group consisting of acrylic, methacrylic and mixtures thereof, and of an alkyl ester of an acid selected from the group consisting of acrylic, methacrylic and mixtures thereof, the alkyl group containing six to eighteen carbon atoms, said polyvinyl ester and interpolymer being present in a ratio of 2 to 50:10.

16. The process of claim 11 wherein said polymerizable formulation comprises a mixture of a vinylidene aromatic hydrocarbon monomer, an unsaturated nitrile monomer selected from the group consisting of acrylonitrile, methacrylonitrile and mixtures thereof, and a preformed rubber upon which said aromatic hydrocarbon and nitrile may be grafted, said vinylidene aromatic hydrocarbon comprising 20 to 95 percent by weight of the monomers in said formulation and said rubber comprising 1 to 30 percent by weight of the total weight of said polymerizable formulation.

17. In a process for polymerizing vinylidene aromatic hydrocarbons, the steps comprising heating and agitating a polymerizable formulation containing at least 30 percent by weight of a vinylidene aromatic hydrocarbon and 1 to 30 percent by weight of a preformed rubber upon which said aromatic hydrocarbon may be grafted to polymerize 20 to 35 percent by weight of the monomers in said polymerizable formulation and obtain a syrup having a viscosity of 40 to 20,000 poises at 25° centigrade at a shear rate of 1.0 second$^{-1}$; suspending said syrup in an aqueous medium to which has been added 0.05 to 10 percent by weight of a soluble inorganic salt as an electrolyte and a suspending agent comprising the synergistic combination of a polymeric polycarboxylic acid and a polymeric alcohol in amounts of from 0.005 to 1.0 percent by weight, based upon the aqueous medium, of each of said polymeric polycarboxylic acid and polymeric alcohol, the ratio of monomer formulation to water being 20 to 150:100, said polymeric polycarboxylic acid comprising a water-soluble homopolymer or interpolymer of unsaturated carboxylic acids having a carbon chain of three to eight carbon atoms and having a degree of polymerization of at least twenty monomer units and providing a pH of less than 6.5 in aqueous solution, said polymeric alcohol corresponding to the following formula:

$$H[CH—HCOX—R]_nH$$

wherein X is hydrogen, HCO—, $CH_3CO$—, or $$CH_3CH_2CO—$$

R is 

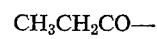

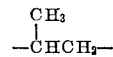

$n$ is at least 10, and at least 5 mol percent but not more than about 35 mol percent of X is an ester group for optimum water-solubility; and thereafter polymerizing said polymerizable formulation.

18. The process of claim 17 wherein the vinylidene aromatic hydrocarbon monomer in said formulation is styrene, wherein said polymerizable formulation contains an unsaturated nitrile monomer selected from the group consisting of acrylonitrile, methacrylonitrile and mixtures thereof, said styrene comprising 20 to 95 percent by weight of the monomers in said formulation.

19. The method in accordance with claim 17 wherein said suspending agent comprises 0.01 to 0.5 percent by weight of a partially hydrolyzed polyvinyl ester and 0.01 to 0.5 percent by weight of an interpolymer of an acid selected from the group consisting of acrylic, methacrylic and mixtures thereof, and of an alkyl ester of an acid selected from the group consisting of acrylic, methacrylic and mixtures thereof, the alkyl group containing six to eighteen carbon atoms, said polyvinyl ester and interpolymer being present in a ratio of 2 to 50:10.

(References on following page)

References Cited

UNITED STATES PATENTS

| | | | |
|---|---|---|---|
| 2,886,553 | 4/1959 | Stein et al. | 260—880 |
| 3,047,534 | 7/1962 | Dyer et al. | 260—880 |
| 3,051,682 | 8/1962 | Ott | 260—880 |
| 3,143,522 | 8/1964 | Conrad et al. | 260—880 |
| 3,328,374 | 6/1967 | Ronden et al. | 260—93.5 |

MURRAY TILLMAN, *Primary Examiner.*

M. J. TULLY, *Assistant Examiner.*

U.S. Cl. X.R.

260—83.5, 83.7, 86.3, 86.7, 93.5, 880, 885